US008907981B2

(12) United States Patent
Betzler et al.

(10) Patent No.: US 8,907,981 B2
(45) Date of Patent: Dec. 9, 2014

(54) METHOD AND SYSTEM FOR DYNAMIC COMPOSING AND CREATING 3D VIRTUAL DEVICES

(75) Inventors: Boas Betzler, Poughkeepsie, NY (US); Xing Fang, Beijing (CN); Neil A. Katz, Boca Raton, FL (US); Sheng Lu, Beijing (CN); Meng Ye, Beijing (CN); Zi Y. Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 908 days.

(21) Appl. No.: 12/613,197

(22) Filed: Nov. 5, 2009

(65) Prior Publication Data
US 2011/0107329 A1    May 5, 2011

(51) Int. Cl.
| G09G 5/00 | (2006.01) |
| G06F 9/455 | (2006.01) |
| G06F 9/50 | (2006.01) |
| G06F 9/44 | (2006.01) |
| G06T 19/00 | (2011.01) |
| G09G 5/14 | (2006.01) |

(52) U.S. Cl.
CPC ............ *G06F 9/4411* (2013.01); *G06F 9/5077* (2013.01); *G09G 5/14* (2013.01); *G06T 19/006* (2013.01); *G06F 9/455* (2013.01)
USPC ............... 345/633; 345/634; 718/1; 715/762; 715/765; 719/324

(58) Field of Classification Search
CPC ...... G06T 19/006; G09G 5/14; G06F 9/4411; G06F 9/455; G06F 9/5077
USPC ........ 345/633; 719/324; 715/762–765; 718/1
See application file for complete search history.

(56) References Cited

U.S. PATENT DOCUMENTS 7,266,777 B2 * 9/2007 Scott et al. .................... 715/762
(Continued)

FOREIGN PATENT DOCUMENTS

| CN | 1470835 A | 1/2004 |
| EP | 1385316 A1 | 1/2004 |

OTHER PUBLICATIONS

"Wake-on-LAN, WOL (Wake on Line)", Wikipedia, http://en.wikipedia.org/wiki/Wake-on-LAN, Sep. 23, 2009.
Zigbee, http://www.zigbee.org/, Sep. 23, 2009.

(Continued)

*Primary Examiner* — Jin-Cheng Wang
(74) *Attorney, Agent, or Firm* — Scully, Scott, Murphy & Presser, P.C.; Daniel P. Morris, Esq.

(57) ABSTRACT

The present invention describes a method and system for governing a physical device or application service in a real world through a virtual device in a virtual world. The physical device or application service registers at least one virtual adaptor of the physical device or application service to a virtual device broker. A user creates or composes the virtual device with the at least one virtual adaptor in the virtual device broker. The user commands to the virtual device through a user interface of the virtual device. The at least one virtual adaptor in the virtual device translates the command to a controlling signal to the physical device or application service. The controlling signal operates the physical device or application service according to the command to the virtual device.

23 Claims, 9 Drawing Sheets

(56) References Cited

U.S. PATENT DOCUMENTS

| | | | |
|---|---|---|---|
| 8,001,553 B2* | 8/2011 | Li et al. | 719/324 |
| 8,060,074 B2* | 11/2011 | Danford et al. | 455/419 |
| 2004/0158620 A1* | 8/2004 | Ha et al. | 709/219 |
| 2005/0220080 A1* | 10/2005 | Ronkainen et al. | 370/352 |
| 2008/0288578 A1* | 11/2008 | Silfverberg | 709/203 |
| 2008/0320500 A1* | 12/2008 | Li et al. | 719/324 |
| 2008/0320501 A1* | 12/2008 | Li et al. | 719/324 |
| 2009/0036111 A1* | 2/2009 | Danford et al. | 455/419 |
| 2009/0222517 A1* | 9/2009 | Kalofonos et al. | 709/204 |
| 2010/0138764 A1* | 6/2010 | Hatambeiki et al. | 715/765 |
| 2010/0146395 A1* | 6/2010 | Reyes et al. | 715/734 |

OTHER PUBLICATIONS

Wi-Fi Alliance, http://www.wi-fi.org/, Sep. 23, 2009.
IGRS, http://www.igrs.org/, Sep. 23, 2009.
IETF, http://www.ietf.org, Sep. 23, 2009.
Fielding, R., et al., "Hypertext Transfer Protocol—HTTP/1.1", RFC 2068, http://www.ietf.org/rfc/rfc2068.txt, Sep. 23, 2009.
"Havi Home Audio Video Interoperability", http://www.xilinx.com/esp/consumer/home_networking/pdf_files/havi/complete.pdf, Sep. 23, 2009.
Jini, http://sun.com/jini/, Sep. 23, 2009.
"Technology, Photography, and Life in Manhattan", http://wwward.typepad.com/blog/2007/01/realworld_contr.html), Jan. 23, 2007.

* cited by examiner

METHOD AND SYSTEM FOR DYNAMIC COMPOSING AND CREATING 3D VIRTUAL DEVICES

BACKGROUND

The present invention generally relates to a virtual world. More particularly, the present invention relates to controlling a physical device or application service in a real world through a virtual device in a virtual world.

A virtual world is a computer-based simulated environment where avatars (i.e., a virtual representation of a user) inhabit and interact with other avatars. Examples of virtual worlds include, but are not limited to: Active Worlds™, Second Life™, There, Eve Online, Metaverse (e.g., a virtual world where humans interact with each other; software application in a three dimensional space that uses a metaphor of a real world) and MMORPGs (Massively Multiplayer Online Role-Playing Games) environments.

A real world is a physical reality of every day life which humans experience. In a real world, a user watches a movie via a DVD (Digital Versatile Disc) player by manually pushing a "play" button on a remote controller. A user operates a laundry machine by manually pushing "power-on" button or switch. A user turns on an air conditioner by manually pushing a "power-on" button on a remote controller. A physical device includes, but is not limited to: a DVD player, television, air conditioner, dish washer, refrigerator, laundry machine, computer, MP3 player, heater, lamp, gas oven, appliance and any other electronic, mechanical or electromechanical device. An application service includes, but is not limited to: software application such as Microsoft® Widows and a service such as a weather forecast service and traffic alter.

Controlling and managing a physical device in a cyberspace (i.e., a non-physical terrain created by a computing system) is desirable. With a rapid development of computer and communication technologies, almost everything can be digitalized and controlled by a digital logic circuit (e.g., ASIC (Application Specific Integrated Circuit). Nowadays, some devices can be controlled remotely by Internet. For example, a desktop computer can be woken up remotely by WOL (wake on-line standard) protocol. WOL protocol refers to an Ethernet computer networking standard that allows a computer to be turned on or woken up remotely by a network message sent by another computer. A router or network switch may include a web-based interface accessible by a web browser (e.g., Firefox®, Microsoft® Internet Explorer®, etc.). Current technology enables a control of a commodity device (e.g., refrigerator) remotely by Internet, specifically, by enabling IP addresses.

A progress of a technology makes a virtual world possible to display objects vivid in a Rich Internet Application (RIA). The RIA are web applications, which have most of properties of desktop applications, delivered by one or more of Macromedia® Flash™, Microsoft® Silverlight™, JavaFX™, etc. These objects in a virtual world could be viewed, controlled and even be changed by a user's command (e.g., a mouse click).

A physical device in a real world may be a component to perform a function. For example, watching a movie at home requires a display device, a sound player and a signal source. To watch the movie, a user may utilize a TV screen as the display, utilize a speaker of the TV as the sound player, and use an antenna as the signal source. Sometimes, the user may replace the antenna with a DVD player or a personal computer. Alternatively, the user may replace the TV speaker with speakers connected to the personal computer. All these changes or replacements are done manually in a real world by re-linking cables between components. Thus, commodity devices (e.g., TV) have many interfaces and cables that may not be used at all.

Thus, it is highly desirable to provide ability for controlling physical devices or applications and their connections in a real world through a virtual device in a virtual world without a need for physically re-linking or re-configuring between components in real world.

SUMMARY OF THE INVENTION

The present invention describes a system and method for controlling physical devices or applications in a real world through a virtual device in a virtual world.

In one embodiment, there is provided a computer-implemented method for governing at least one physical device or application service in a real world through at least one virtual device in a virtual world, the method comprising:

registering at least one virtual adaptor of the at least one physical device or application service to a virtual device broker;

creating the at least one virtual device having the at least one virtual adaptor in the virtual device broker;

operating the at least one virtual device in the virtual world, by specifying one or more command, through a user interface accessible via the at least one virtual device; and translating the specified command to a controlling signal for controlling the at least one physical device or application service, the controlling signal operating the at least one physical device or application service according to the at least one virtual device operation.

In one embodiment, there is provided a computer-implemented system for governing at least one physical device or application service in a real world through at least one virtual device in a virtual world, the system comprising:

a memory device; and a processor unit in communication with the memory device, the processor unit performs steps of:

registering at least one virtual adaptor of the at least one physical device or application service to a virtual device broker;

creating the at least one virtual device having the at least one virtual adaptor in the virtual device broker;

operating the at least one virtual device in the virtual world, by specifying one or more command, through a user interface accessible via the at least one virtual device; and translating the specified command to a controlling signal for controlling the at least one physical device or application service, the controlling signal operating the at least one physical device or application service according to the at least one virtual device operation.

In a further embodiment, the at least one virtual adaptor defines a capability, data interface and control interface of the at least one physical device or application. The capability describes what the at least one physical device or application can do. The data interface describing how the at least one physical device or application receives data from the at least one virtual device. The control interface describing how the at least one physical device or application can be controlled.

In a further embodiment, the at least one virtual adaptor performs the translation.

In a further embodiment, the physical device or application performs steps of:

receiving the controlling signal from the virtual device broker or other physical device or application service;

receiving, at a first functional module, input data from said other physical device or application service, buffering the input data, pre-processing the input data and sending the input data to other functional modules in the at least one physical device or application service; and receiving, at a second functional module, output data from other functional module in the at least one physical device or application service, buffering the output data and sending the output data to other physical device or application service.

In a further embodiment, the virtual device broker performs steps of:

receiving a registration request of the at least one virtual adaptor from the at least one physical device or application service;

receiving a virtual adaptor updating request from at least one physical device or application service and updating one or more of the at least one virtual adaptor according to the virtual adaptor updating request;

maintaining a virtual adaptor library that stores a plurality of virtual adaptors including the at least one virtual adaptor;

defining the at least one virtual device upon receiving a command for the creating or composing the at least one virtual device;

controlling the at least one physical device or application service; and terminating one or more of the at least one virtual device.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings, FIG. 1 illustrates an exemplary environment which one embodiment of the present invention applies to.

DETAILED DESCRIPTION

A user performs an operation on a virtual device, e.g., by specifying one or more command (e.g., a mouse click) on the virtual device. The operation includes, but is not limited to: turning on the virtual device, connecting the virtual device with other virtual device(s), turning off the virtual device and terminating the virtual device. According to one embodiment of the present invention, at least one virtual adaptor in the virtual device translates the operation to a controlling signal, which is communicated to or otherwise input to at least one corresponding physical device and/or application service, for controlling the at least one corresponding physical device and/or application service. A physical device includes, but is not limited to: an appliance such as TV, DVD player, telephone, dish washer, refrigerator, computer, any other electronic, mechanical or electromechanical device, etc. The application service includes, but is not limited to: software providing services or functions (i.e., network traffic information, low battery information, etc.) for physical devices or other software.

The controlling signal includes one or more of a reserving signal, a releasing signal and a functional signal. The reserving signal controls at least one physical device or application service to reserve at least one function module for at least one virtual device whose command or operation is translated to the controlling signal. Examples of the command or operation include, but not limited to: "create a virtual device", "open a virtual device", "close a virtual device" and "destroy a virtual device". The releasing signal controls the at least one physical device or application service to release the reservation. The functional signal comes from a user who controls the virtual device whose commands or operations are translated into the controlling signal, and this functional signal describes functions needed to be performed in the at least one physical device or application service.

Figure 1:
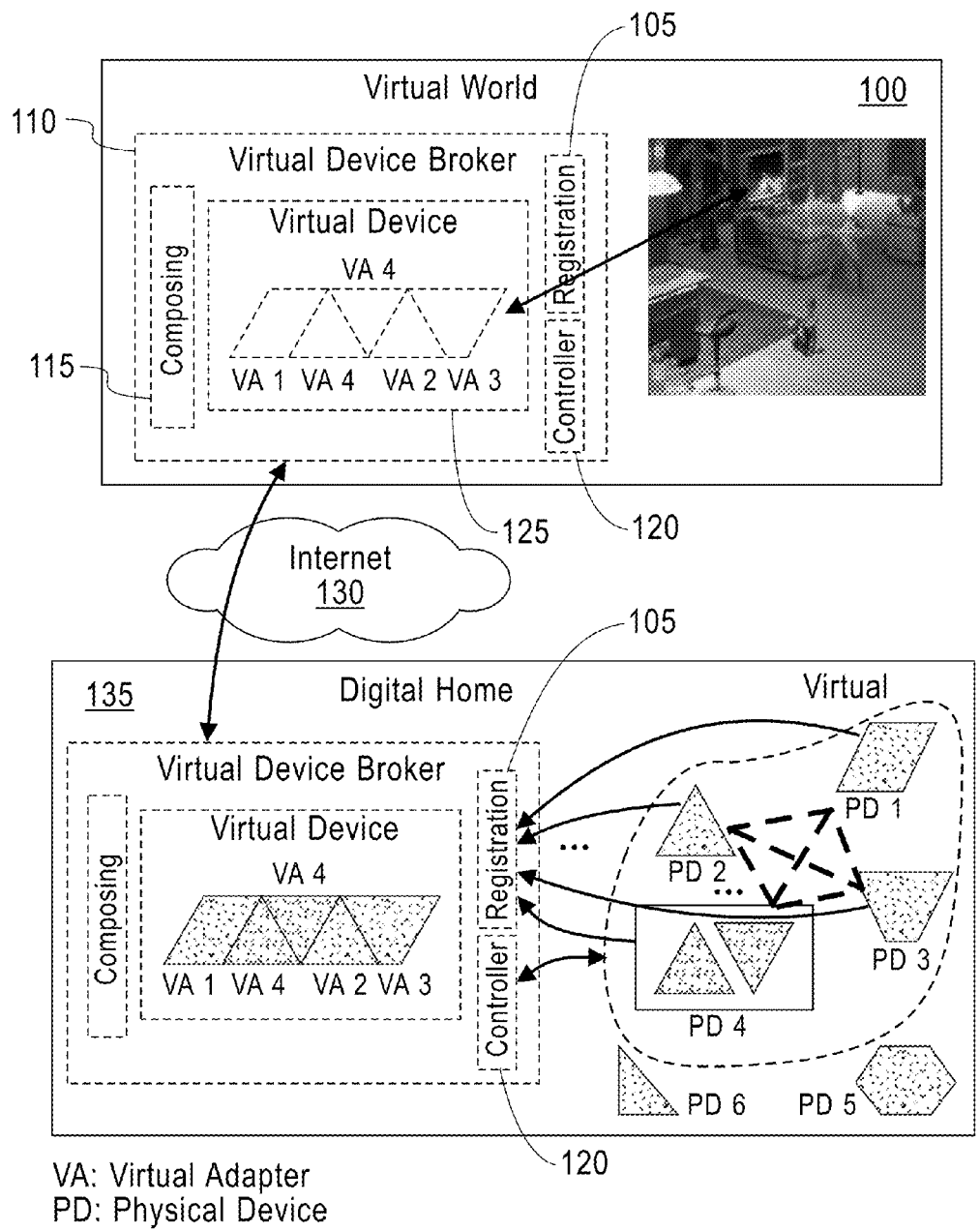

FIG. 1 illustrates an exemplary environment where a user is enabled to control at least one physical device or application service (e.g., PD1, PD2, PD 3 PD 4 or PD5 depicted in FIG. 1) in a real world (e.g., a digital home 135) through a user interface accessible via at least virtual device 125 in a virtual world 100. The user interface accessible via the at least one virtual device 125 includes, but is not limited to: graphical user interface (GUI) and a spatial user interface (i.e., three dimensional user interface). In this embodiment the, a physical device or application service includes at least one sensor or actuator. The at least one physical device or application service in a real world registers virtual adaptor(s) (e.g., a VA1, a VA2, a VA3 or two VA 4s) to a virtual device broker 110 through a registration module 105.

A virtual adaptor defines a capability, data interface and control interface of the at least one physical device or application. The capability describes what the at least one physical device or application service can do. The data interface describes how the at least one physical device or application service receives data from a virtual device or other physical device or application service. The control interface describes how the at least one physical device or application service can be controlled. According to one embodiment of the present invention, a virtual device refers to a 2D (two dimensional) or 3D (three dimensional) visual object in a virtual world that represents a physical device or application service or a composite of several physical devices or application services. A virtual device broker 110 manages (e.g., maintains lifecycles of virtual devices) virtual device(s) and controls corresponding physical device or application services to perform functions defined by those virtual devices.

Upon receiving a registration request (i.e., a request for registering virtual adaptors) from the at least one physical device or application service, the registration module 105 checks whether there is a conflict or duplication to register the virtual adaptors of the at least one physical device or application service. If there is no conflict or duplication found, the registration module 105 accepts the registration request and allows a user to access the virtual adaptors of the at least one physical device or application service. A virtual adaptor may represent one or more hardware or software module of the at least one physical device or application service. After registering the virtual adaptors, a user may create or compose at least one virtual device 125 with the registered virtual adaptors in the virtual device broker. Upon receiving a creation or composition request of a virtual device 125, a composing module 115 may allow a user to use a pre-defined virtual device model(s) (e.g., an on-off switch, a rotary phone, a cellular phone, etc.) in a virtual device model library (e.g., a database storing the pre-defined virtual device models) as template(s) to construct the virtual device 125. Alternatively, the composing module 115 may allow a user to write a virtual device description (described herein after in detail) to customize a virtual device 125. The virtual device description includes one or more of: at least one virtual adaptor and connection information between virtual adaptors.

After creating or composing a virtual device 125, a user operates the virtual device 125, e.g., by specifying a command, through a user interface (not shown) of the virtual device 125. According to the operation on the virtual device 125, a virtual device controller 120 controls physical devices or application services: first, the virtual device controller 120 sends a reserving signal(s) to a corresponding physical device(s) or application service(s). A reserving signal includes virtual device topology information that informs the corresponding physical devices or application services of from where and what data will be received, and to where and what data will be sent. When a user operates the virtual device 125, virtual adaptors (e.g., VA1-VA4) in the virtual device 125 translates the command or the operation to a controlling signal. The virtual device controller 120 sends the controlling signal to the corresponding physical device or application services, e.g., via Internet 130, a local wireless communication (e.g., Bluetooth®) or a remote wireless communication (e.g., Satellite communication). When a virtual device is terminated by a user, the terminated virtual device is removed from a virtual device list (i.e., a list of available virtual devices; e.g., a virtual device list 740 in FIG. 7). Then, the virtual device controller 120 sends releasing signals to corresponding physical devices and/or application services.

Figure 9:
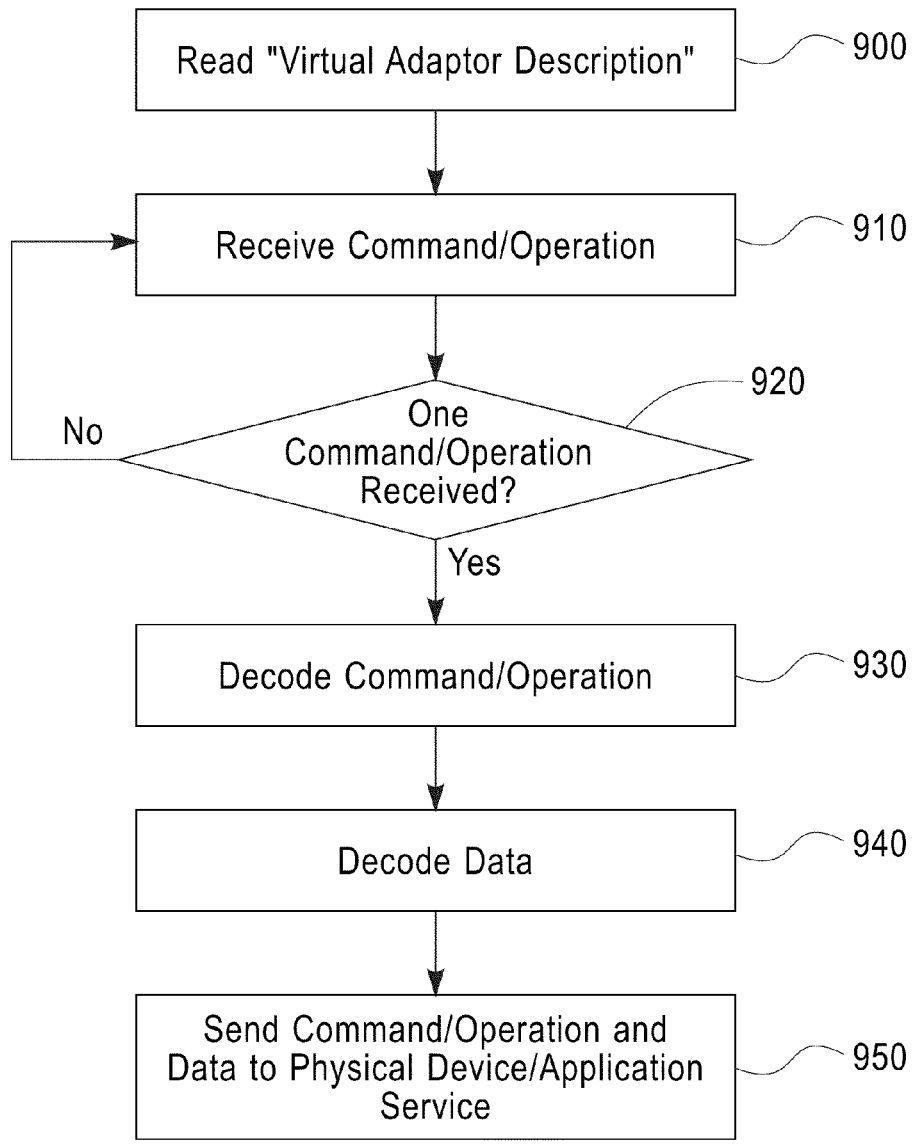
FIG. 9 illustrates a flow chart describing method steps for translating a command to a virtual device into a controlling signal to a physical device or application service according to one embodiment of the present invention.

FIG. 9 illustrates a flow chart describing method steps for translating a command on a virtual device into a controlling signal to a physical device or application service according to one embodiment of the present invention. At step 900, a computing system 800 reads a virtual adaptor description (e.g., List 1 described below) to implement the virtual adaptor. At step 910, the virtual adaptor receives a command and/or operation (e.g., a mouse click) on the virtual device 125 where the virtual adaptor resides. At step 920, the virtual adaptor evaluates whether a single command or operation is received via a user interface of the virtual device 125. If the single command or operation is not received, the control returns to the step 910 and the virtual adaptor waits until it receives a command or operation. Otherwise, at step 930, the virtual adaptor decodes the command or operation to control the physical device or application service. For example, the virtual adaptor decodes a mouse click on the virtual device 125 into an electronic signal (e.g., power on or power off signal) to control the physical device and/or application service. At step 940, the virtual adaptor decodes data accompanied with the command or operation. The data includes, but not limited to: an IP address of the physical device and/or application service, virtual contents (e.g., graphical images), etc. At step 950, the virtual adaptor sends the decoded command (or operation) and decoded data to the physical device and/or application via a network (e.g., Internet 130).

In one embodiment, every physical device and application service has an IP interface (e.g., an interface supporting network communication protocols such as TCP/IP) and a communication interface (e.g., Small Computer System Interface (SCSI)). SCSI is a set of standards for connecting and transmitting data between computers and peripheral devices. As described above, the virtual adaptor decodes the command and/or operation into a controlling signal which fit the communication interface and decodes data into data signals which also fit the communication interfaces. Then, the virtual device broker sends the controlling and data signals to the IP and communication interfaces. Then, physical device and/or application service is triggered by the controlling and data signals.

Figure 2:
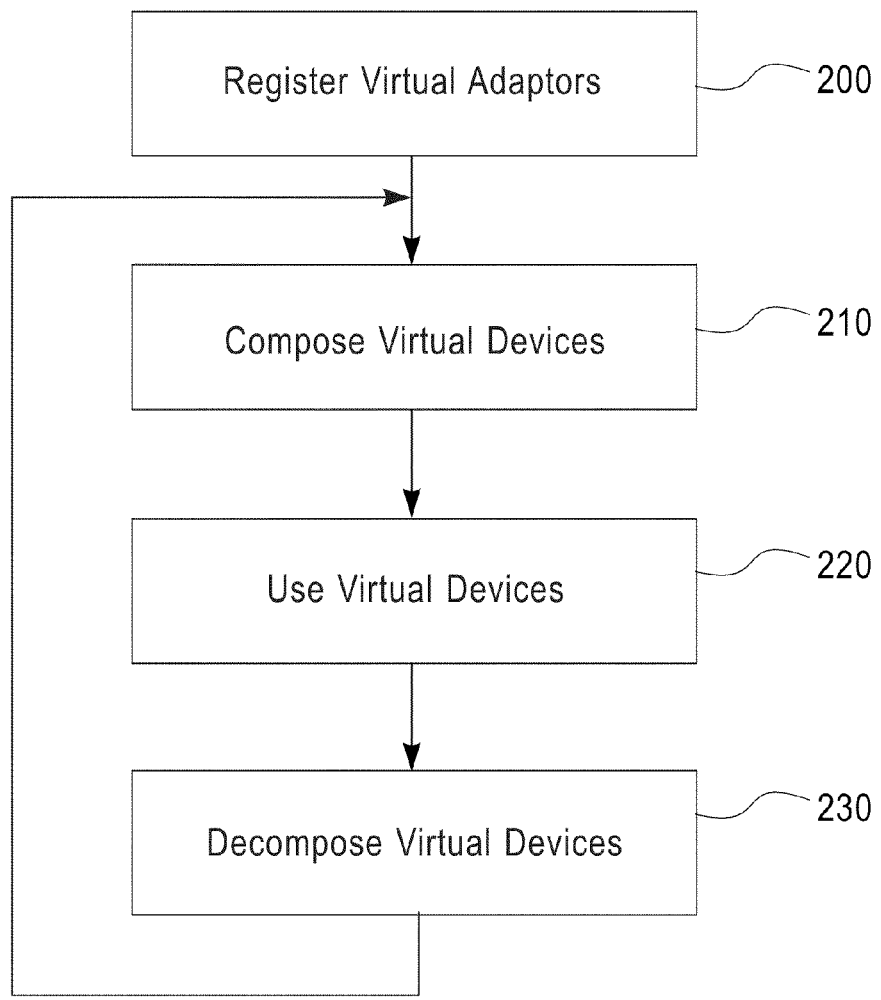
FIG. 2 illustrates a flow chart depicting a lifecycle of a virtual device according to one embodiment of the present invention.

FIG. 2 illustrates a lifecycle of a virtual device 125 according to one embodiment of the present invention. At step 200, a physical device or application service registers one or more virtual adaptors to the virtual device broker 110, e.g., via the registration module 105. At step 210, a user creates or composes at least one virtual device, e.g., via the composing module 115. At step 220, the user operates or commands the created or composed virtual device, e.g., through user interfaces of the virtual device. Virtual adaptors in the created or composed virtual device translate the operation or command to a controlling signal for operating the corresponding physical device or application service according to the operation or command to the virtual device. At step 230, if the virtual device becomes unnecessary, the user requests a termination or removal of the virtual device to the virtual device broker 110. Then, the virtual device broker 110 releases the physical device or application service and decomposes or removes the virtual device. If a physical device or application service is released (from a virtual device) by a virtual device broker 110, the released physical device or application service can be used in another virtual device as control moves from step 230 to step 210.

Figure 3:
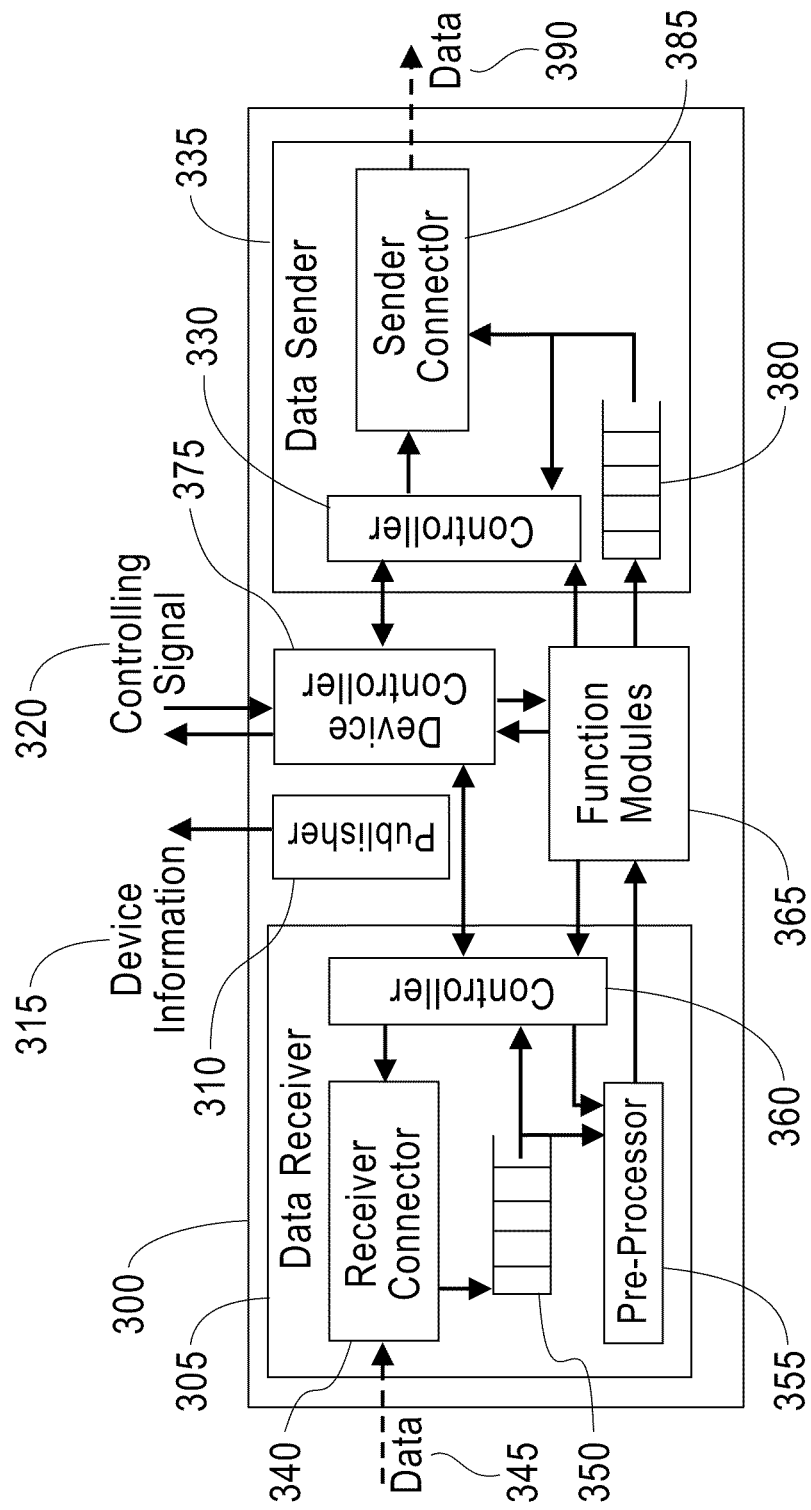
FIG. 3 illustrates a composition of a physical device or application according to one embodiment of the present invention.

FIG. 3 illustrates a physical device or application service 300, which is equivalent to one or more of PD 1-PD 6. In order to operate according commands coming from virtual device(s), physical devices and/or application services implement special function modules beyond traditional function modules (i.e., modules performing functions of the physical devices and/or application services). These special function modules include, but are not limited to: a publisher module 310, a device controller 375, a data receiver 305 and a data sender 335, as shown in FIG. 3.

The data receiver (a first functional module) 305 receives controlling signals 320, via the device controller 375, from virtual device broker(s) and other physical device or application service. The data receiver 305 includes, but is not limited to: a receiver connector 340, a controller 360, a buffer 350 and a pre-processor 355. The data receiver 305 receives input data 345 from other physical device or application service, buffers the input data 345, pre-processes the input data 345 and then sends the pre-processed data to other functional modules 365 in the physical device or application service 300. The data receiver 365 also receives data from other functional module 365. The functional modules 365 handle or process the pre-processed data. For example, if the physical device or application service 300 is a DVD player, the functional modules 365 perform open, close, play, pause, stop, forward or backward functions of the DVD player. The receiver connector 304 is a data communication interface between the physical device and/or application service 300 and other physical device and/or application service. The controller 360 manages the input data received from other physical device and/or application service: the controller 360 queues the input data at the buffer 350, pre-processes the input data at the pre-processor 355 and feeds the pre-processed data to the functional modules 365.

The data sender (a second functional module) 335 includes, but is not limited to: a controller 330, a sender connector 385 and a buffer 380. The data sender 335 receives output data from the functional modules 365 in the physical device or application service 300, buffers the output data, sends the output data to other physical device and/or application service according to a virtual device topology (e.g., a map of virtual devices), e.g., through Internet or power line communication (PLC). The PLC is a mechanism for sending and receiving data signals over electric power transmission line. The sender connector 385 is a data communication interface between the physical device and/or application service 300 and other physical device(s) and/or application service(s). A controller 330 in the data sender 335 manages data sent to other physical device and/or application service: the controller 330 queues the output data at a buffer 380 and sends the output data via the sender connector 385 to other physical device and/or application service.

The device controller 375 controls the functional modules 365, manages data received from other physical devices and/or application services, e.g., by controlling the controller 360, and manages data sent to other physical devices and/or application services, e.g., by controlling the controller 330. The management done by the device controller 375 includes, but is not limited to: receiving data, decoding data, buffering data and transmitting data to the function modules 365. The control done by the device controller 375 includes, but is not limited to: starting and/or stopping to receive data, starting and/or stopping to buffer data, starting and/or stopping to decode data, and starting and/or stopping to transmit data.

Figure 4:
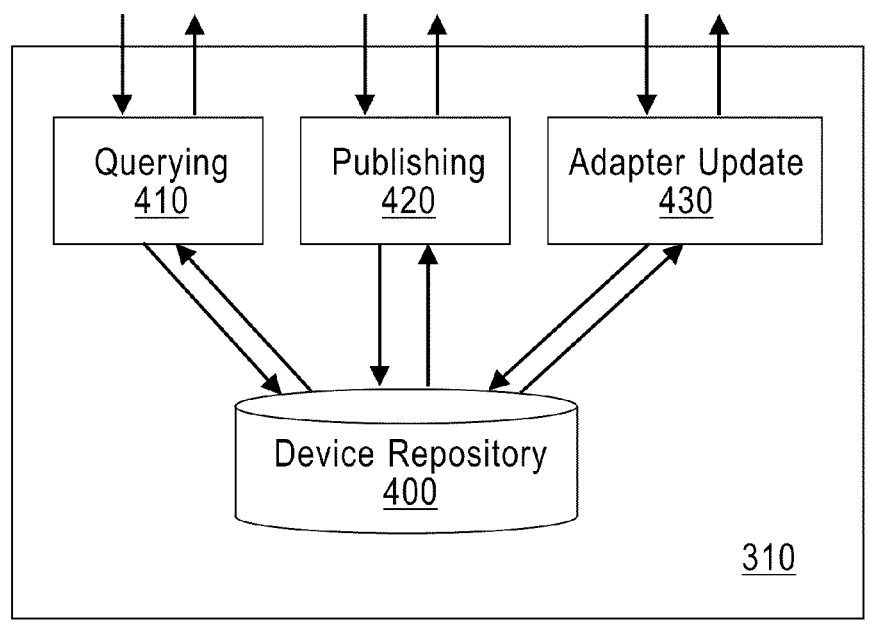
FIG. 4 illustrates a composition of a publisher module a according to one embodiment of the present invention.

FIG. 4 illustrates a diagram of the publisher module 310 according to one embodiment of the invention. The publisher module 310 includes, but is not limited to: a querying module 410, a publishing module 420, a virtual adaptor update module 430 and a virtual device repository 400. The publishing module 420 publishes device information 315 (e.g., virtual adaptor(s)) to a virtual device broker 110. In other words, the publishing module 420 registers virtual adaptors to a virtual device broker 110. The querying module 410 receives query request(s) from user(s), and handles the query request(s) for device information (i.e., information regarding virtual device(s) and/or virtual adaptor(s). The querying module 410, in one embodiment, may be a DBMS (Database Management System) tool (e.g., IBM® DB2™). The virtual adaptor update module 430 updates virtual adaptors according to a virtual adaptor updating request. In one embodiment, the virtual adaptor updating request may include an updated or modified portion of the virtual adaptor description. A computing system (e.g., a computing system 800 in FIG. 8) may run the updated portion of the virtual adaptor description to update a corresponding virtual adaptor. The virtual device repository 400 communicates with the querying module 410, the publishing module 420 and the virtual adaptor update module 430. The virtual device repository 400 stores available virtual adaptors (e.g., VA1-VA4 in FIG. 1) in a database or a storage device (e.g., a disk, an optical disc, a flash drive, etc.).

According to one embodiment of the invention, a virtual device is a composite of several physical devices and/or application services. In virtual device broker(s), a user can compose or create virtual devices with virtual adaptors. Because virtual adaptors are representatives of physical devices and/or application services, the virtual devices composed by virtual adaptors can be mapped onto physical devices and/or application services.

Figure 8:
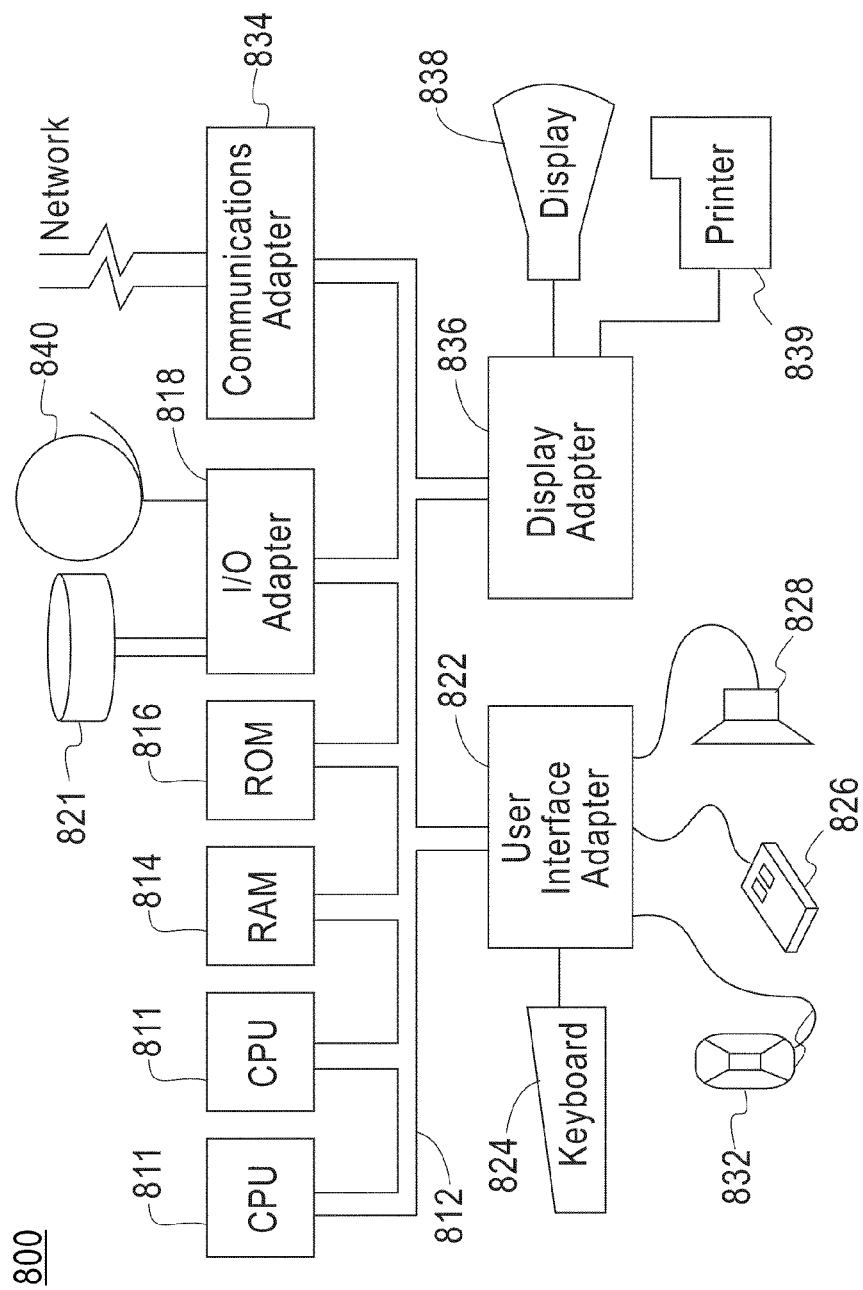
FIG. 8 illustrates an exemplary hardware configuration for implementing a virtual adaptor, virtual device and/or virtual device broker according to one embodiment of the present invention.

A user describes or creates a virtual adaptor by running a virtual adaptor description in a computing system (e.g., a computing system 800 in FIG. 8). The virtual adaptor description may written by one or more of Java®, Java® Script, XML, HTML, C/C++, Perl, .Net, etc. What follows is an example of pseudo code listing describing a virtual adaptor.

List 1 virtual adaptor description

```
<virtual adaptor>
    <adaptorID> describe a virtual adaptor ID </adaptorID>
    <name> describe a virtual adaptor name
    </name>
    <description> briefly describe characteristics of the virtual adaptor such as a creator,
creation date, where the virtual adaptor can be used, etc.
    </description>
    <function> describe function of the virtual adaptor
    </function>
    <model> describe a model or version of the virtual adaptor
    </model>
    <control> describe controlling signals
        <signal1> describe a first controlling signal
            <description> describe a characteristic of the first controlling signal such
as a reserving signal, releasing signal or functional signal </description>
            <encode> describe an encoding method of the first controlling signal
        </encode>
        </signal1>
        <signal2> describe a second controlling signal
            <description> describe a characteristic of the second controlling signal
such as a reserving signal, releasing signal or functional signal </description>
            <encode> describe an encoding method of the second controlling signal
        </encode>
        </signal2>
        ... continue to describe other controlling signals
    </control>
    <interface> describe data communication interface of the virtual adaptor
        <input> describes communication channels for input (e.g., input data or
controlling signals)
            <channel1> describe a first input communication channel of the virtual
adaptor
```

List 1 virtual adaptor description (continued)

```
        <channelID> describe a channel ID of the first input
communication channel </channeled>
        <encode> describe an encoding method of the first input
communication channel </encode>
        <quality> describe a quality characteristic (e.g., signal-to-noise
ratio) of the first input communication channel </quality>
      </channel1>
      <channel2> describe a second input communication channel of the virtual
adaptor
        <channelID> describe a channel ID of the second input
communication channel </channelID>
        <encode> describe an encoding method of the second input
communication channel </encode>
        <quality> describe a quality characteristic (e.g., signal-to-noise
ratio) of the second input communication channel </quality>
      </channel2>
      ... continue to describe other input communication channels
    </input>
    <output> describes communication channels for output (e.g., output data or
controlling signals)
      <channel1> describe a first output communication channel of the virtual
adaptor
        <channelID> describe a channel ID of the first output
communication channel </channelID>
        <encode> describe an encoding method of the first output
communication channel </encode>
        <quality> describe a quality characteristic (e.g., signal-to-noise
ratio) of the first output communication channel </quality>
      </channel1>
      <channel2> describe a second output communication channel of the
virtual adaptor
        <channelID> describe a channel ID of the second output
communication channel </channelID>
        <encode> describe an encoding method of the second output
communication channel </encode>
        <quality> describe a quality characteristic (e.g., signal-to-noise
ratio) of the second output communication channel </quality>
      </channel2>
      ... continue to describe other output communication channels
    </output>
  </interface>
  <physical device> describe corresponding physical device or application service of the
virtual adaptor (a user controls the corresponding physical device or application through a virtual
device having that virtual adaptor)
    <address> describe a network address or IP address of the corresponding physical
device or application service of the virtual device </address>
    <functionID> describe an ID of a function to be achieved by the corresponding
physical device or application service of the virtual device </functionID>
  </physical device>
</virtual adaptor>
```

The virtual adaptor description (e.g., List 1) describes, but is not limited to: an identification of a virtual adaptor being described, a name of the virtual adaptor, characteristics of the virtual adaptor, functions or purposes of the virtual adaptor, a model or version of the virtual adaptor, a description of controlling signals to be communicated to a corresponding physical device or application service to be controlled, communication interfaces of the virtual adaptor and the corresponding physical device or application service including the IP address and functions of the corresponding physical device or application service.

Figure 5:
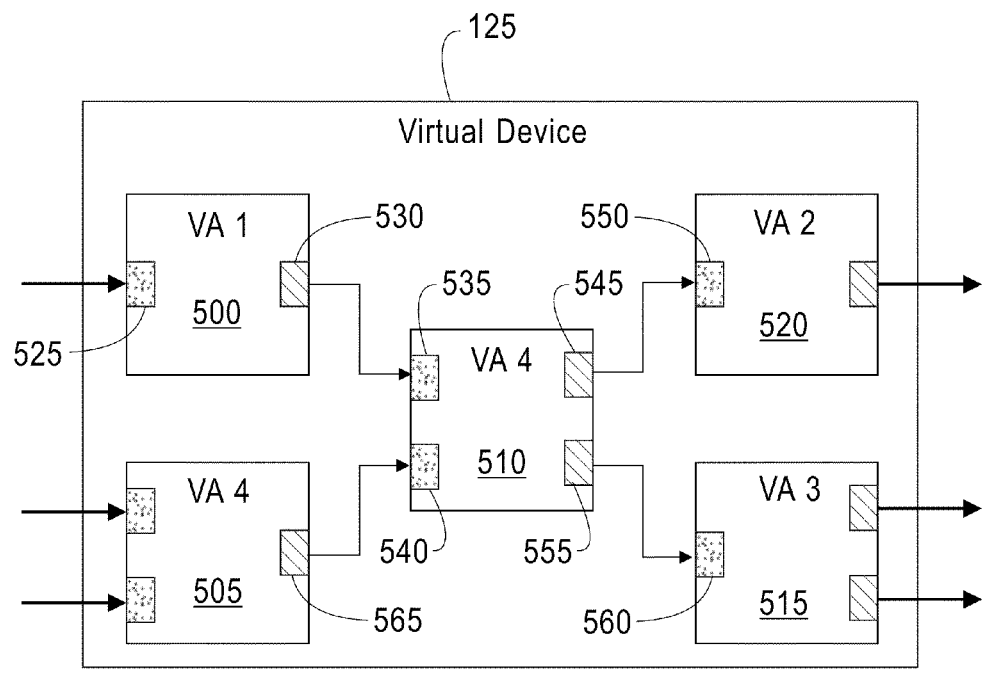
FIG. 5 illustrates an exemplary composition of a virtual device according to one embodiment of the present invention.

When a user composes or creates a virtual device, the user will select virtual adaptor(s) according to expected functions of the virtual device. Then, the virtual device broker matches an output communication channel of a virtual adaptor to an input communication channel of another virtual adaptor, as shown in FIG. 5. (FIG. 5 illustrates exemplary virtual connections between virtual adaptors in a virtual device 125.) Then, the virtual device broker 110 generates a virtual device description (e.g., List 2) based on the match(es). In other words, the virtual device broker 110 completes the virtual device description based on the selected virtual adaptor(s) and their connections (i.e., match(es)). Alternatively, a user may write the virtual device description. A computing system 800 creates a virtual device by running the virtual device description. The virtual device description may written by one or more of Java®, Java® Script, XML, HTML, C/C++, Perl, .Net, etc. What follows is an example of pseudo code listing describing a virtual device.

List 2 virtual device description

```
<virtualdevice>
    <virtualadpator> describe each virtual adaptor in the virtual device
```

List 2 virtual device description

```
        <virtualadaptor1> describe a first virtual adaptor, e.g., a virtual adaptor ID
described in List 1 </virtualadaptor1>
        <virtualadaptor2> describe a second virtual adaptor </virtualadaptor2>
        ... continue to describe other virtual adaptors in the virtual device
        </virtualadaptor>
    <connection> describe connection between virtual adaptors
        <connection1> describe a first connection between virtual adaptors
            <inputchannelID> describe an input channel ID of a first virtual adaptor
</inputchannelID>
            <outputchannelID> describe an output channel ID of a second virtual
adaptor </outputchannelID>
            // (comments) the output channel of the second virtual adaptor is
connected to the input channel of the first virtual adaptor
        </connection1>
        <connection2> describe a second connection between virtual adaptors
            <inputchannelID> describe an input channel ID of a third virtual adaptor
</inputchannelID>
            <outputchannelID> describe an output channel ID of a fourth virtual
adaptor </outputchannelID>
            // (comments) the output channel of the fourth virtual adaptor is connected
to the input channel of the third virtual adaptor
        </connection2>
        ... continue to describe other connections between virtual adaptors
    </connection>
</virtualdevice>
```

The virtual device description describes, but not limited to: virtual adaptors included in the virtual device and connections between the virtual adaptors.

FIG. 5 illustrates exemplary virtual connections between virtual adaptors in a virtual device 125 according to one embodiment of the present invention. The virtual device 125 includes, but is not limited to: a first virtual adaptor 500, a second virtual adaptor 520, a third virtual adaptor 515 and fourth virtual adaptors 505-510 (two fourth virtual adaptors). Each virtual adaptor may include one or more data receiver device(s) 525 and one or more data sender device(s) 530. A data receiver device may operate as an input port. A data sender device may operate as an output port. The controlling signals may be communicated between virtual adaptors. In this exemplary embodiment, a data receiver of the first virtual adaptor 500 and data receiver devices of the fourth virtual adaptor 505 operates as input interfaces of the virtual device 125. A data sender device 530 of the first virtual adaptor 525 is connected to a first data receiver device 535 of the fourth virtual adaptor 510, e.g., by running a script "first_data_receiver_of_the_fourth_virtual_adaptor (535)=data_sender_of_the_first_virtual_adaptor (530)". A data sender device 565 of the fourth virtual adaptor 505 is connected to a second data receiver device 540 of the fourth virtual adaptor 510. A first data sender device 545 of the fourth virtual adaptor 510 is connected to a data receiver device 550 of the second virtual adaptor 520. A second data sender device 555 of the fourth virtual adaptor 510 is connected to a data receiver device 560 of the third virtual adaptor 515. A data sender device of the second virtual adaptor 520 and data sender devices of the third virtual adaptor 515 operates as output interfaces of the virtual device 125.

Figure 6:
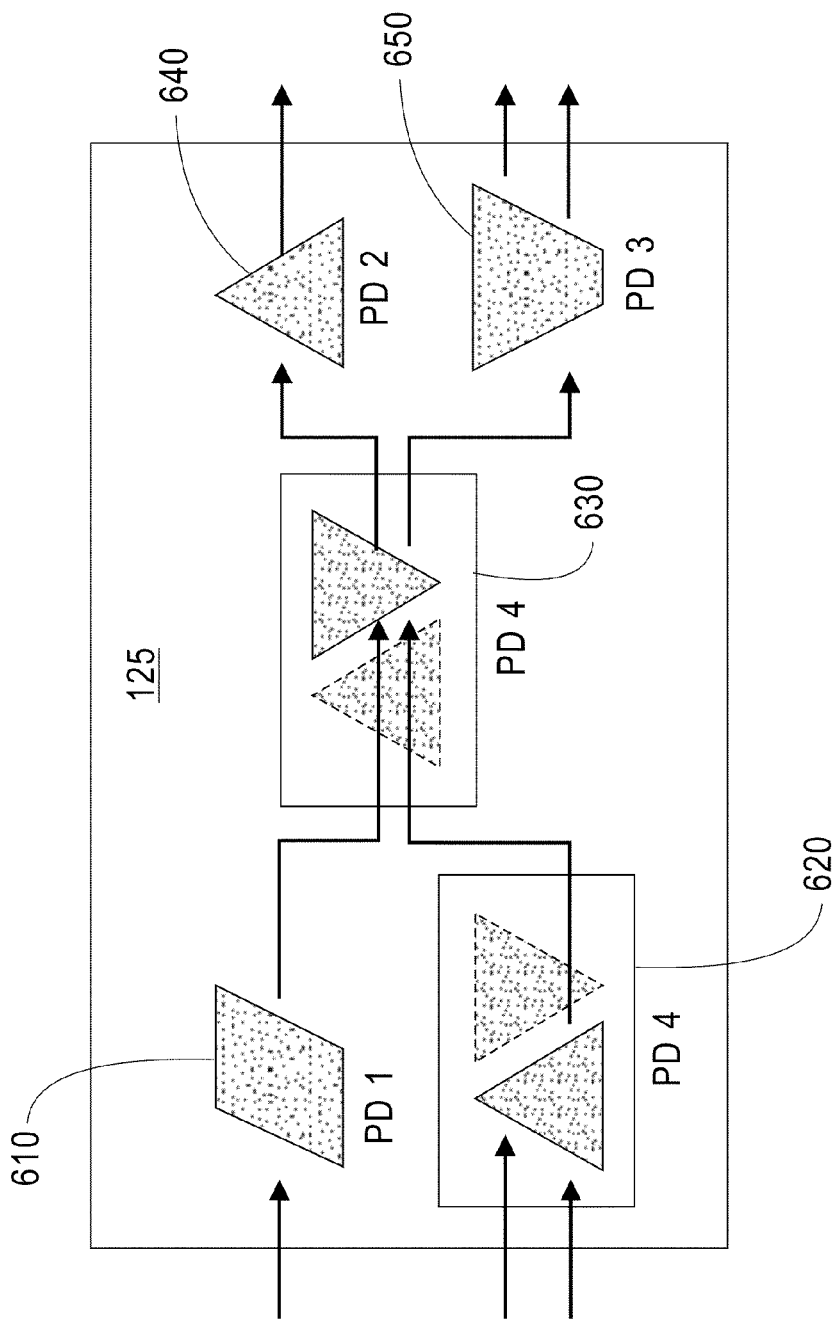
FIG. 6 illustrates an exemplary representation of a virtual device according to one embodiment of the present invention.

By running the virtual adaptor description and/or the virtual device description in a computer system 800, a virtual device 125, such as FIG. 5, is mapped to physical device and/or application services. FIG. 6 illustrates an exemplary mapping to the physical devices and/or application services according to one embodiment of the invention. The first virtual adaptor 500 of FIG. 5 may correspond to a first physical device and/or application service 610, e.g., based on a virtual adaptor description of the first virtual adaptor 500. (At the end of a virtual adaptor description, a user describes a corresponding physical device or application service of a virtual adaptor.) The fourth virtual adaptor 505 of FIG. 5 may correspond to a fourth physical device and/or application service 620. The fourth virtual adaptor 510 of FIG. 5 may correspond to a fourth physical device and/or application service 630. The second virtual adaptor 520 of FIG. 5 may correspond to a second physical device and/or application service 640. The third virtual adaptor 515 of FIG. 5 may correspond to a third physical device and/or application service 650. After matching or mapping between each virtual adaptor and each physical device or application service is done, a virtual device broker 110 configures input and output interfaces of the physical device and/or application services 610-650. In this embodiment, the virtual device broker 110 automatically, without requiring manual connection, configures the input and output interfaces of the physical device or application services 610-650 based on connections depicted in FIG. 5, e.g., by using by using a wireless communication standard (e.g., Zigbee, 802.1x), Internet protocol (e.g., HTTP), a commodity interoperation protocol (e.g., IGRS.org) and other standards such as Havi (Home Audio Video Interoperability). The Havi is a standard for networking digital audio and video appliances using an IEEE 1394 interface (i.e., a serial bus interface standard for high-speed communications and real-time data transfer).

When re-linking or re-configuring between physical devices or applications is necessary, a user creates or modifies a virtual device having corresponding virtual adaptors. The user performs the creation or modification in a virtual device broker 110 in a virtual world, e.g., by creating or revising the virtual device description. The creation or modification includes, but is not limited to: re-writing a corresponding virtual device description to reflect the necessary re-linking or re-configuration in the real world, modifying an existing virtual device description to reflect the necessary re-linking or re-configuration in the real world, and creating a virtual device description to reflect the necessary re-linking or re-configuration in the real world. The virtual adaptors in the modified or created virtual device may translate command(s) for the creation or modification to controlling signal to automatically re-link or re-configure the physical devices or applications, e.g., by using a wireless communication standard (e.g., Zigbee, 802.1x), Internet protocol (e.g., HTTP), a commodity interoperation protocol (e.g., IGRS.org) and other standards such as Havi. Then, the virtual adaptor sends the controlling signal to corresponding physical device or application services to do these re-linking or re-configuring. Thus, a user can dynamically re-configure or re-link physical devices or applications in a real world without physically re-configuring or re-linking the physical devices and/or applications, e.g., by modifying or creating a virtual device in a virtual world. The virtual device broker dynamically maps capabilities and configurations of physical devices and/or applications to one or more virtual devices. For example, if a user wants to change a video signal source from a DVD player to a personal computer, the user performs the change by modifying the mapping of virtual device(s) in a virtual world as the user wishes: the user may revise a virtual device description to delete a virtual adaptor corresponding to the DVD player and to add another virtual adaptor corresponding to the personal computer in the virtual device description.

A user can map a single virtual device to one or more physical devices or applications. For example, a user can map a single virtual display to two physical display devices, e.g., two portable DVD players having wireless internet connections. These two portable DVD players can display an exact same movie provided from a source (i.e., a virtual DVD rental store in a virtual world). Thus, a first user on a business trip can watch the same movie with a second user at home at the same time. The present invention can be applied in other usage scenarios that are not described herein. In this example, a virtual device description may include two different virtual adaptors. A first virtual adaptor represents a first portable DVD player used during the business trip. A second virtual adaptor represents a second portable DVD player used at home.

Figure 7:
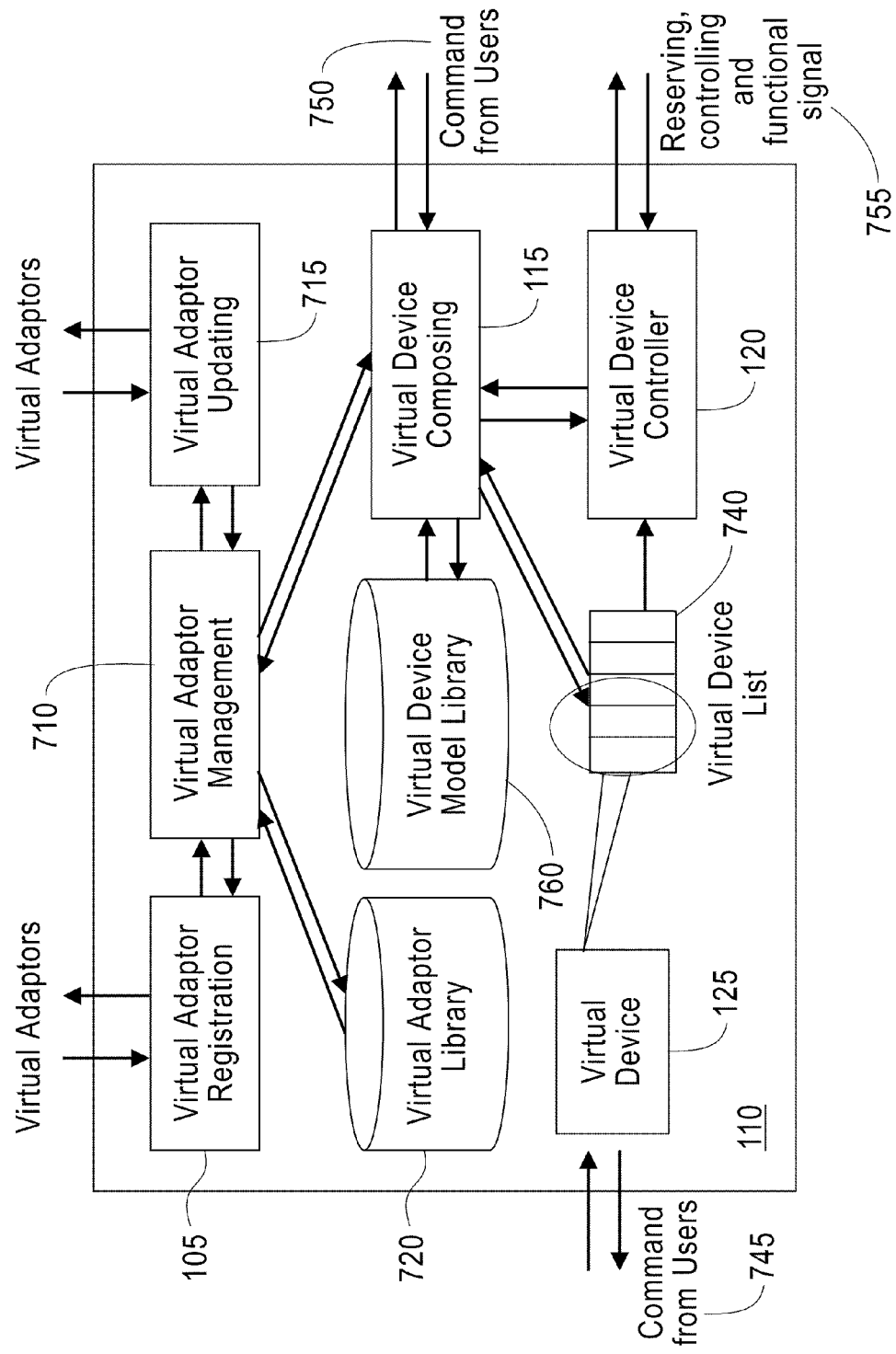
FIG. 7 illustrates a composition of a virtual device broker according to one embodiment of the present invention.

FIG. 7 illustrates a virtual device broker 110 according to one embodiment of the present invention. The virtual device broker includes, but is not limited to: a virtual adaptor registration module 105, virtual adaptor management module 710, virtual adaptor updating module 715, virtual device composing module 115, virtual device controller 120, virtual adaptor library 720, virtual device model library 760 and virtual device list 740.

The virtual adaptor registration module 105 receives a registration request(s) from physical devices and/or application services. Virtual adaptor descriptions (e.g., List 1) may be included in these requests. The computing system (e.g., a computing system 800 in FIG. 8) may create or compose virtual adaptors, e.g., by running the virtual adaptor descriptions. The virtual adaptors may be stored in the virtual adaptor library 720, which is a database or storage device. The virtual adaptor updating module 715 receives virtual adaptor updating requests from physical devices and/or application services. A virtual adaptor updating request may include a portion of a virtual adaptor description or a complete virtual adaptor description. The computing system updates a virtual adaptor according to the virtual adaptor updating request, e.g., by running the portion of the virtual adaptor description or the complete virtual adaptor description.

The virtual adaptor management module 710 maintains the virtual adaptor library 720. The virtual adaptor management module 710 may be a DBMS (Database Management System) tool (e.g., IBM® DB2™). The virtual device composing module 115 handles commands to create or compose a virtual device from a user. A user defines functions and modules of a virtual device. There are at least two methods to define virtual devices according to this embodiment. In a first method, a user can use a virtual device model in the virtual device model library 760 as a template to define a virtual device 125. In a second method, a user can define a customized virtual device, e.g., by writing a virtual device description (e.g., List 2). After users define functions and modules of a virtual device, the virtual device composing module 115 searches and selects virtual adaptors from the virtual adaptor library 720. The selected virtual adaptors comply with the defined functions and modules of the virtual device 125. In the searching process, sections of the function description and the interface description in virtual adaptor descriptions are the most important information to comply with the defined functions and modules of the virtual device 125. Then, the computing system creates or composes the virtual device 125, e.g., by running the virtual device description or by using the virtual device model. After a virtual device 125 is created, the virtual device 125 is placed in the virtual device list 740. The virtual device list 740 may be implemented by a data structure such as a buffer, queue, list, stack or vector.

The virtual device controller 120 controls physical devices and/or application services: the virtual device controller 120 sends at least one reserving signal 755 to at least one physical device and/or application that a user wants to control through his/her virtual device(s). Then, when the user operates the virtual device(s), virtual adaptors in those virtual device(s) translate the operation to at least one controlling signal. The virtual device controller 120 sends the controlling signals 755 to the physical devices and/or application services. When a user wishes to terminate or remove a virtual device, the virtual device controller 120 removes that virtual device (virtual device to be removed or terminated) from the virtual device list 740. The virtual device controller 120 sends a releasing signal to corresponding physical devices and/or application services which were controlled by the terminated or removed virtual device. The releasing signal releases the corresponding physical devices and/or application services from the terminated or removed virtual device.

The virtual device broker 110 can be implemented in a virtual world. Then, a user may use 3D (three dimensional) models of virtual adaptors to create or compose virtual devices freely. The created or composed virtual devices may have 3D user interfaces. A user can operate the virtual devices through the 3D user interfaces.

The physical device and/or application service receives controlling signals from the virtual device controller 120 in the virtual device broker 110. The virtual adaptors translate user's commands on the virtual device 125 into the controlling signals. The controlling signals include, but are not limited to: the reserving signal, the releasing signal and/or the functional signal. When corresponding physical device and/or application service receives the controlling signals, the physical device and/or application service operates according to controlling signals reflecting the user's commands on the virtual device 125.

In one embodiment, physical devices and/or application services register their virtual adaptors to the virtual adaptor registration module 105 in the virtual device broker 110. The virtual adaptor management module 710 in the virtual device broker 110 stores the virtual adaptors in the virtual adaptor library 720, e.g., via the publisher module 420. If a user wants to create the virtual device 125, he/she performs the creation in a portal (not shown) in the virtual world 100. The portal sends a first command associated with the creation to the virtual device composing module 115 in the virtual device broker 110. The broker 110 translates the first command and sends reserving signals to physical devices and/or application services through the virtual device controller 120. Then, the physical devices and/or application services reserve themselves and make connections to other physical devices and/or application services. Later, the user uses the virtual device 125. Then, a second command or operation on the virtual device 125 is sent to the virtual adaptors. The virtual adaptors translate the second command or operations into controlling signals. Then, the virtual device broker 110 sends the controlling signals to physical devices and/or application services. The devices and/or services perform actions according to the controlling signals.

In one embodiment, the method steps in FIG. 2 are implemented in hardware or reconfigurable hardware, e.g., FPGA (Field Programmable Gate Array) or CPLD (Complex Programmable Logic Device), using a hardware description language (Verilog, VHDL, Handel-C, or System C). In another embodiment, the method steps in FIG. 2 are implemented in a semiconductor chip, e.g., ASIC (Application-Specific Integrated Circuit), using a semi-custom design methodology, i.e., designing a chip using standard cells and a hardware description language. Thus, the hardware, reconfigurable hardware or the semiconductor chip operates the method steps described in FIG. 2.

In one embodiment, the virtual device broker 110 is implemented in hardware or reconfigurable hardware, e.g., FPGA or CPLD, using a hardware description language. In another embodiment, the virtual device broker 110 is implemented in a semiconductor chip, e.g., ASIC, using the semi-custom design methodology.

FIG. 8 illustrates an exemplary hardware configuration of a computing system 800 running a virtual adaptor description (List 1) or virtual device description (List 2) and/or implementing a virtual device broker 110, virtual device 125, virtual adaptor and the method steps in FIG. 2. The hardware configuration preferably has at least one processor or central processing unit (CPU) 811. The CPUs 811 are interconnected via a system bus 812 to a random access memory (RAM) 814, read-only memory (ROM) 816, input/output (I/O) adapter 818 (for connecting peripheral devices such as disk units 821 and tape drives 840 to the bus 812), user interface adapter 822 (for connecting a keyboard 824, mouse 826, speaker 828, microphone 832, and/or other user interface device to the bus 812), a communication adapter 834 for connecting the system 800 to a data processing network, the Internet, an Intranet, a local area network (LAN), etc., and a display adapter 836 for connecting the bus 812 to a display device 838 and/or printer 839 (e.g., a digital printer of the like).

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions runnable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, .Net, Binary code) run by a processor (e.g., Intel® Core™, IBM® PowerPC®) for causing a computer to perform method steps of this invention. The present invention may include a method of deploying a computer program product including a program of instructions in a computer readable medium for one or more functions of this invention, wherein, when the program of instructions is run by a processor, the compute program product performs the one or more of functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A computer-implemented method for governing plural physical devices in a real world through a single virtual device in a virtual world, the virtual world being a computer-based simulated environment, the method comprising:

registering virtual adaptors of the plural physical devices to a virtual device broker;

using at least one virtual device in a virtual device library as a template to construct the single virtual device, the virtual device library storing a plurality of virtual devices;

using at least one virtual device description and at least one virtual adaptor description to customize the constructed single virtual device, the at least one virtual device description including: the registered virtual adaptors and connection information between the registered virtual adaptors, a description of controlling signals associated with the one or more registered virtual adaptors for controlling the plural physical devices in the real world, characteristics of each controlling signal, an encoding method of each controlling signal, one or more communication channels associated with the one or more registered virtual adaptors, an encoding method of each communication channel, and a quality characteristic of each communication channel, wherein the one or more communication channels send and receive said controlling signals over an electric power transmission line;

operating the customized single virtual device in the virtual world, by specifying one or more commands, through a user interface accessible via the customized single virtual device, the virtual world enabling avatars to interact with other avatars, an avatar being a virtual representation of a user; and translating the specified command to a controlling signal, the controlling signal operating, simultaneously and in an identical manner, the plural physical devices in the real world according to the operation of the customized single virtual device in the virtual world, wherein the registering, the using the at least one virtual device, the using the at least one virtual device description, the operating and the translating are performed by a computing system that includes at least one processor and at least one memory device.

2. The computer-implemented method according to claim 1, wherein the virtual adaptors define a capability, data interface and control interface of the plural physical devices, the capability describing what the plural physical devices can do, the data interface describing how the plural physical devices receive data from the single virtual device, and the control interface describing how the plural physical devices can be controlled.

3. The computer-implemented method according to claim 1, wherein the virtual adaptors represent hardware or software modules in the plural physical devices.

4. The computer-implemented method according to claim 1, wherein the user interface is a spatial user interface.

5. The computer-implemented method according to claim 1, wherein the virtual adaptors perform the translation.

6. The computer-implemented method according to claim 1, wherein the virtual device broker maintains a lifecycle of the single virtual device and maintains the plural physical devices to perform functions defined by the operation.

7. The computer-implemented method according to claim 1, wherein the plural physical devices perform steps of:
receiving the controlling signal from other physical device;
receiving, at first functional modules in the plural physical devices, input data from said other physical device, buffering the input data, pre-processing the input data and sending the input data to other functional modules in the plural physical devices; and
receiving, at second functional modules in the plural physical devices, output data from said other functional modules in the plural physical devices, buffering the output data and sending the output data to said other physical device.

8. The computer-implemented method according to claim 7, wherein the plural physical devices further perform a step of:
publishing the virtual adaptors to the virtual device broker, handling a query request regarding the single virtual device, and updating the virtual adaptors.

9. The computer-implemented method according to claim 7, wherein the controlling signal includes one or more of: a reserving signal, releasing signal or functional signal, the reserving signal controlling the plural physical devices to reserve at least one functional module for the single virtual device, the releasing signal controlling the plural physical devices to release the reservation and the functional signal coming from a user who controls the single virtual device and describing functions needed to be performed in the plural physical devices.

10. The computer-implemented method according to claim 9, wherein the reserving signal includes virtual device topology information that informs the plural physical devices of from where and what data will be received and to where and what data will be sent.

11. The computer-implemented method according to claim 10, wherein the virtual device broker performs steps of:
receiving a registration request of the virtual adaptors from the plural physical devices;
receiving a virtual adaptor updating request from at least one physical device and updating one or more of the virtual adaptors according to the virtual adaptor updating request;
maintaining a virtual adaptor library that stores a plurality of virtual adaptors including the virtual adaptors;
defining the single virtual device upon receiving a command for the creating the single virtual device;
controlling the plural physical devices; and
terminating the single virtual device.

12. The computer-implemented method according to claim 11, wherein the controlling of the plural physical devices comprises:
sending the reserving signal to the plural physical devices;
operating the single virtual device;
translating the operation to the controlling signal; and
sending the controlling signal to the plural physical devices.

13. The computer-implemented method according to claim 1, wherein the plural physical devices or application in the real world are located in different geographical locations.

14. A non-transitory computer readable medium embodying computer program instructions being run by a processor for causing a computer to perform method steps for governing plural physical devices in a real world through a single virtual device in a virtual world, the virtual world being a computer-based simulated environment, said method steps comprising the steps of claim 1.

15. A computer-implemented system for governing plural physical devices in a real world through a single virtual device in a virtual world, the virtual world being a computer-based simulated environment, the system comprising:
a memory device; and
a processor unit in communication with the memory device, the processor unit performs steps of:
registering virtual adaptors of the plural physical devices to a virtual device broker;

using at least one virtual device in a virtual device library as a template to construct the single virtual device, the virtual device library storing a plurality of virtual devices;

using at least one virtual device description and at least one virtual adaptor description to customize the constructed single virtual device, the at least one virtual device description including the registered virtual adaptors and connection information between the registered virtual adaptors, a description of controlling signals associated with the one or more registered virtual adaptors for controlling the plural physical devices in the real world, characteristics of each controlling signal, an encoding method of each controlling signal, one or more communication channels associated with the one or more registered virtual adaptors, an encoding method of each communication channel, and a quality characteristic of each communication channel, wherein the one or more communication channels send and receive said controlling signals over an electric power transmission line;

operating the customized single virtual device in the virtual world, by specifying one or more command, through a user interface accessible via the customized single virtual device, the virtual world enabling avatars to interact with other avatars, an avatar being a virtual representation of a user; and translating the specified command to a controlling signal for the controlling signal operating, simultaneously and in an identical manner, the plural physical devices in the real world according to the operation of the customized single virtual device in the virtual world.

16. The computer-implemented system according to claim 15, wherein the virtual adaptors define a capability, data interface and control interface of the plural physical devices, the capability describing what the plural physical devices can do, the data interface describing how the plural physical devices receive data from the single virtual device, and the control interface describing how the plural physical devices can be controlled.

17. The computer-implemented system according to claim 15, wherein the virtual adaptors represent hardware or software modules in the plural physical devices.

18. The computer-implemented system according to claim 15, wherein the plural physical devices perform steps of:
receiving the controlling signal from other physical device;
receiving, at first functional modules in the plural physical devices, input data from said other physical device, buffering the input data, pre-processing the input data and sending the input data to other functional modules in the plural physical devices; and
receiving, at second functional modules in the plural physical devices, output data from said other functional modules in the plural physical devices, buffering the output data and sending the output data to said other physical device.

19. The computer-implemented system according to claim 18, wherein the plural physical devices further perform a step of:
publishing the virtual adaptors to the virtual device broker, handling a query request regarding the single virtual device, and updating the virtual adaptors.

20. The computer-implemented system according to claim 18, wherein the controlling signal includes one or more of: a reserving signal, releasing signal or functional signal, the reserving signal controlling the plural physical devices to reserve at least one functional module for the single virtual device, the releasing signal controlling the plural physical devices to release the reservation and the functional signal coming from a user who controls the single virtual device and describing functions needed to be performed in the plural physical devices.

21. The computer-implemented system according to claim 20, wherein the reserving signal includes virtual device topology information that informs the plural physical devices of from where and what data will be received and to where and what data will be sent.

22. The computer-implemented system according to claim 21, wherein the virtual device broker performs steps of:
receiving a registration request of the adaptors from the plural physical devices;
receiving a virtual adaptor updating request from at least one physical device and updating one or more of the virtual adaptors according to the virtual adaptor updating request;
maintaining a virtual adaptor library that stores a plurality of virtual adaptors including the virtual adaptors;
defining the single virtual device upon receiving a command for the creating the single virtual device;
controlling the plural physical devices; and
terminating the single virtual device.

23. The computer-implemented system according to claim 22, wherein the controlling of the at least one physical device comprises:
sending the reserving signal to the plural physical devices;
operating the single virtual device;
translating the operation to the controlling signal; and
sending the controlling signal to the plural physical devices.

* * * * *